A. E. GOVER
ELECTRIC SCINTILLATING JEWELER'S ADVERTISING DEVICE
Jan. 5, 1932.
Original Filed Sept. 5, 1928
Re. 18,314
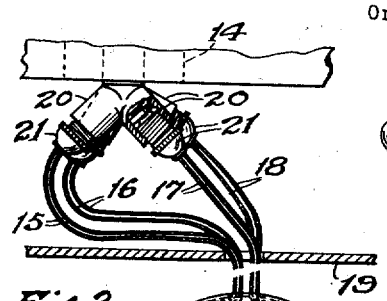
Fig. 1
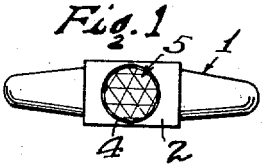
Fig. 2
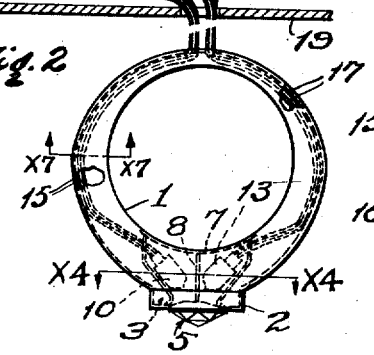
Fig. 3
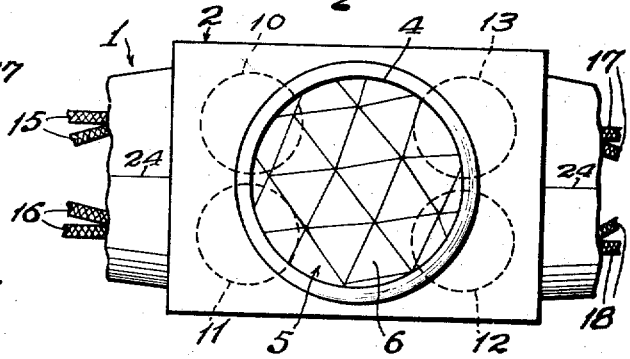
Fig. 4
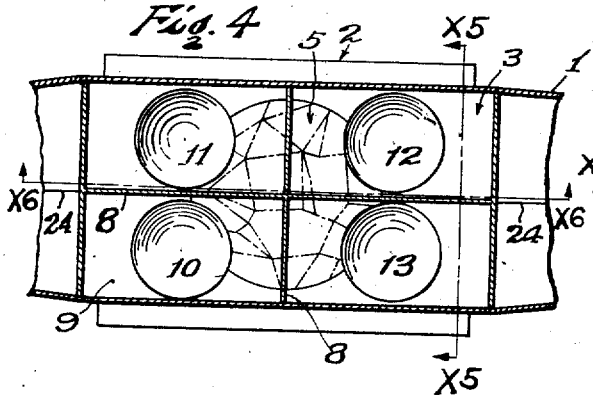
Fig. 5
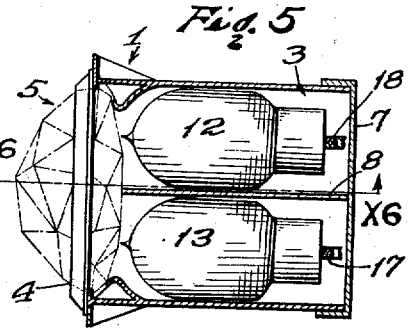
Fig. 6
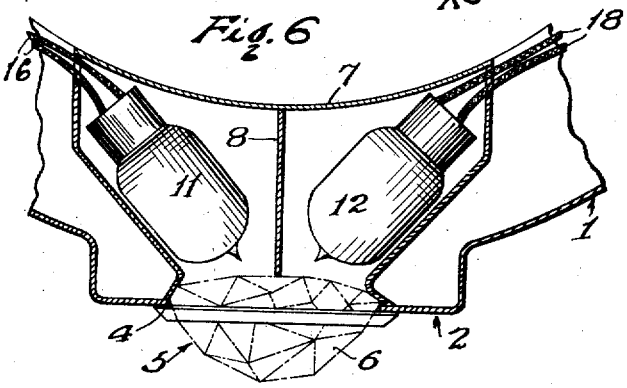
Fig. 7
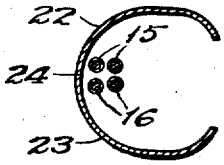
INVENTOR
ALFRED E. GOVER
WITNESSES:
J. STREHLE
John A. McDowell
By James R. Townsend
his atty Reissued Jan. 5, 1932

Re. 18,314

UNITED STATES PATENT OFFICE

ALFRED E. GOVER, OF PATCHOGUE, NEW YORK

ELECTRIC SCINTILLATING JEWELER'S ADVERTISING DEVICE

Original No. 1,771,710, dated July 29, 1930, Serial No. 304,156, filed September 5, 1928. Application for reissue filed September 29, 1931. Serial No. 565,910.

This invention relates to means for producing an attractive window display advertisement for jewelers in which I provide a setting having a translucent jewel cut with facets representing a precious stone such as a diamond and mount the same in a case having wings adapted for attachment to a frame. In this invention said setting comprising a hollow case adapted to contain electric lights, is separately connected with a circuit through thermal flashing switches.

In carrying out this invention in the preferred form, I provide a circular case having an enlargement at one side and a gap in said enlargement in which I mount the setting and its jewel; and I provide said case with a channel or channels on the inside thereof and with one or more holes opening through the case into the channels, and I also provide a detachable plate at the inner side of the hollow setting; and in making the device, electric lamps are mounted inside the chamber of the setting, and the leads therefrom are disposed in the channel or channels and lead through the hole or holes for connection at the rear through the thermal switches, with the electric circuit.

I provide inside the chamber, partitions to separate the chamber into a number of compartments from which the light from the lamps will be emitted through distinctive portions of the jewel with the result that when the current is turned on, the lamps send intermittent flashes through distinct and different areas of the jewel, thus making the jewel present to the eye scintillations resembling scintillations from a cut diamond or other precious stone.

To further heighten the effect, I provide in said compartments, electric lamps having globes of different colors, such as red, green and yellow, together with a transparent globe through which latter the full white light of the lamp will be directed to the jewel.

The invention includes the combination with the frame, of the hollow setting case and lamps of different color values in such case.

It is understood that I do not limit myself to the specific form of the setting, the shape of the frame, the number, or the colors of the lamps, nor the number or shape of the compartments in the setting, as the invention is applicable in various ways and to frames representing various forms of rings, brooches, and other kinds of jewelry.

An advantage of this invention is that the scintillations of different colored lights will give the appearance of a real diamond to a jewel of large size so as to awaken interest and wonder in the mind of the passerby and thus call attention to the jewelry display in the window.

Other objects, advantages and features of the invention may appear from the accompanying drawings, the subjoined detailed description and the appended claims.

The accompanying drawings illustrate the invention.

Figure 1 is a view of the invention applied in the form of a ring, as the same might appear to one viewing it displayed in a jeweler's window.

Fig. 2 is a view at right angles to Fig. 1, showing one form of construction of the invention in which the display consists of a ring presenting the appearance of the ring shown in Fig. 1. Parts are broken away to expose parts that would otherwise be hidden.

Fig. 3 is an enlarged front elevation of the setting and part of the frame and the leads shown in Fig. 2. Dotted lines indicate the lamps behind the jewel.

Fig. 4 is a section on line $x^4$, Fig. 2, looking out in the direction of the arrows.

Fig. 5 is a section on line indicated at $x^5$, Fig. 4.

Fig. 6 is a section on line $x^6$, Figs. 4 and 5.

Fig. 7 is an enlarged view in section on line $x^7$, Fig. 2.

In the preferred form, and as shown, the frame 1 is an opaque circlet to represent a finger ring, and the setting 2 is an opaque case formed with a chamber 3 having a front opening 4 forming a seat in which is set the translucent jewel 5 having facets 6. 7 is an opaque closure for the rear of the case. 8 is an opaque partition forming compartments 9 in which are disposed electric lamps as at 10, 11, 12 and 13 that are separately connected to a circuit 14 by leads 15, 16, 17 and 18 that pass through an opaque screen 19 and are independently controlled manually as by screw plugs 20, and automatically as by thermal flash switches 21 that connect the leads with the circuit 14.

The frame 1 may be of any suitable material and is shown as made of two like sheet metal stampings 22, 23, soldered, brazed or otherwise secured together at the central joint 24.

In practice the closure 7 may be formed integral with the partition 8 which is shown in the form of a cross fitting friction tight in the case, thus forming four compartments in the chamber and permitting access to the chamber for the purpose of installing, withdrawing and replacing the lamps. The closure may have ears 25 under which an instrument may be inserted for the purpose of removing the closure.

After the device is installed, all or any of the lights may be manually turned on and off, and the operation of the thermal switches automatically causes the lamps to intermittently illuminate their specific compartments and the light therefrom is refracted through the jewel and gives the required scintillating effect.

The jewel shown in the drawings is made of clear glass cut to represent a diamond and the intermittent flashes from the lamps of different colors cause the scintillations through the jewel to display flashes of different colors, thus giving the appearance of a pure large brilliant diamond.

What is claimed is:

1. An advertising device comprising a case having partitions therein; a jewel in one side of the case; partitions in the case forming chambers open to the jewel; electric light means in the chambers; electrical conductors carried by the frame and connected to the lights; means closing the case; means concealing the electric conductors and thermal flash means for causing the lights to flash in the chambers independently of each other.

2. A frame having a gap in one side thereof; a case closing the gap and provided with a translucent jewel having exterior facets open to the interior of the casing; partitions in the case; a series of intermittent flashing electric lamps in the spaces between the partitions arranged to throw their light through the jewel; electric conductors concealed in the frame and connected to the lamps for intermittently and separately illuminating different areas of the inner face of the jewel.

3. In a device of the character set forth, a frame composed of two like sheet metal stampings secured together at a central join and forming an opaque circle having a chamber provided with a front opening forming a seat for a jewel; an opaque closure for the rear of the case; an opaque partition that forms compartments for electric lamps; an opaque screen through which leads may pass for connection with lamps in said compartments; said compartments being open to said seat; and a translucent jewel in said seat.

4. In an electric scintillating advertising device, a translucent jewel, an opaque hollow casing having a chamber provided with an opening in which the jewel is seated, a plurality of electric lamps of different colors located within said chamber, and a thermal flashing switch in each lamp circuit outside of said chamber for intermittently lighting said lamps at irregular intervals to cause the jewel to scintillate.

5. In an electric scintillating advertising device, a translucent jewel, an opaque hollow casing having a chamber provided with an opening in which the jewel is seated, said chamber being divided into a plurality of compartments opening to the jewel, an electric lamp located in each of said compartments, said lamps being of different colors, and a thermal flashing switch in each lamp circuit outside of said compartments for intermittently lighting said lamps at irregular intervals to cause the jewel to scintillate.

In testimony whereof I affix my signature.

ALFRED E. GOVER.